US010293958B2

(12) United States Patent
Bolton et al.

(10) Patent No.: US 10,293,958 B2
(45) Date of Patent: May 21, 2019

(54) SYSTEM AND METHOD FOR DETECTING AND REMOVING MOISTURE IN AN AIRCRAFT

(71) Applicant: The Boeing Company, Chicago, IL (US)

(72) Inventors: Joseph A. Bolton, Newalla, OK (US); Matthew R. Larson, Edmond, OK (US); Sarah E. Zayic, Seatac, WA (US); Niki Lewis, Atlanta, GA (US)

(73) Assignee: THE BOEING COMPANY, Chicago, IL (US)

( * ) Notice: Subject to any disclaimer, the term of this patent is extended or adjusted under 35 U.S.C. 154(b) by 29 days.

(21) Appl. No.: 15/446,661

(22) Filed: Mar. 1, 2017

(65) Prior Publication Data

US 2018/0251235 A1    Sep. 6, 2018

(51) Int. Cl.
*B64F 1/36* (2017.01)
*B64F 5/40* (2017.01)
*B64F 5/60* (2017.01)

(52) U.S. Cl.
CPC .............. *B64F 1/362* (2013.01); *B64F 1/364* (2013.01); *B64F 5/40* (2017.01); *B64F 5/60* (2017.01)

(58) Field of Classification Search
CPC ..... B64F 1/362; B64F 5/60; F24F 3/14; F24F 11/30; B64D 45/00; G01N 27/02; G01N 27/048; G01N 22/00; G01N 22/04; G01R 27/26; G01R 27/28; G01R 27/2605
USPC ........ 165/223, 222; 324/694, 634, 640, 643, 324/664, 689
See application file for complete search history.

(56) References Cited

U.S. PATENT DOCUMENTS

| 4,272,014 | A   | * | 6/1981  | Halfpenny ............. | B64D 13/00 236/44 B |
| 7,871,038 | B2  | * | 1/2011  | Space .................... | B64D 13/06 244/118.5 |
| 7,967,250 | B2  |   | 6/2011  | Lobato et al.          |                     |
| 8,040,243 | B2  | * | 10/2011 | Bommer ............     | G06K 19/0717 340/10.41 |
| 9,546,004 | B1  | * | 1/2017  | Safai .....................| B64D 45/00          |

(Continued)

FOREIGN PATENT DOCUMENTS

WO         2006012266 A1    2/2006

OTHER PUBLICATIONS

May 4, 2018 European Patent Office Extended Search Report.

*Primary Examiner* — Justin M Jonaitis
(74) *Attorney, Agent, or Firm* — Toler Law Group, P.C.

(57) ABSTRACT

A system and method for detecting and removing moisture in a vehicle such as a commercial aircraft is disclosed. Moisture detection sensors are mounted in areas of the vehicle which are inaccessible during use. The sensors output a signal when moisture is present in an adjacent area. Conduits are installed in the vehicle with a first end adjacent to an associated moisture detection sensors. A dry gas supply unit that is separate from the vehicle is coupled to a second end of each conduits to selectively supply dry gas thereto. The dry gas supply unit selectively supplies dry gas to the second end of each conduit when an associated moisture detection sensor outputs a signal indicating that moisture is present in the adjacent area. The moisture detection sensors are preferably passive and only output a signal upon receipt of an external interrogation signal from the dry gas supply unit controller.

20 Claims, 3 Drawing Sheets

(56) References Cited

U.S. PATENT DOCUMENTS

| | | | |
|---|---|---|---|
| 2004/0206854 A1* | 10/2004 | Shah | B64D 15/20 |
| | | | 244/144 |
| 2007/0023536 A1* | 2/2007 | Baston | F24F 3/14 |
| | | | 236/44 C |
| 2010/0087957 A1 | 4/2010 | Gibbons | |
| 2012/0156979 A1 | 6/2012 | Gray et al. | |

* cited by examiner

SYSTEM AND METHOD FOR DETECTING AND REMOVING MOISTURE IN AN AIRCRAFT

FIELD

This disclosure relates generally to a system and method for detecting and removing moisture in an aircraft and, more particularly, for detecting and removing moisture within inaccessible areas of an aircraft to prevent corrosion from occurring in such inaccessible areas.

BACKGROUND

The need to monitor the integrity of structural elements arises in many different applications. For example, it is necessary to monitor the structures of commercial aircraft. These aircraft stay in service for many years and may experience various working environments. Therefore, it is necessary to regularly check the structural integrity of the vehicle as part of any prudent maintenance program. Conventional testing techniques such as visual inspection, x-ray, dye penetrant, and electrical field techniques (e.g., eddy current testing, etc.) for testing structural elements have many drawbacks.

Visual inspection of structural members often requires some degree of disassembly of the structure. This adds greatly to the overall testing cost. Commercial aircraft must be regularly inspected for structural integrity. However, visual inspection of aircraft structures often requires substantial disassembly of structure and removal of installed equipment in order to provide the access needed to view normally inaccessible areas of interest at a distance adequate to detect corrosion visually. For example, regular visual inspections to detect the presence of potential corrosion of metallic floor structure in wet areas of aircraft, such as behind sidewalls and under lavatories, galleys, and entry doors, can be burdensome. These time-consuming and costly inspections often reveal that the structure has no corrosion. Additionally, floor panel removal requires that factory seals be broken. Moreover, since there is a risk that the quality of the resealing may not be as high as the original factory seals, initial inspections may actually make the structure more susceptible to corrosion thereafter.

Sensors have been used to detect the presence of moisture in the inaccessible areas of a commercial aircraft, but once detected it can still be time-consuming and costly to obtain access to such areas in order to remove the moisture and thereby prevent the buildup of corrosion.

Accordingly, there is a need for a system and method which both identifies the presence of moisture in an inaccessible area of an aircraft and removes such moisture.

SUMMARY

In a first aspect, a system is disclosed for detecting and removing moisture in a vehicle. At least one moisture detection sensor is mounted in the vehicle for outputting a signal when moisture is present in an area adjacent thereto. At least one on-board conduit is installed in the vehicle having a first end adjacent to an associated one of the at least one moisture detection sensors and a second end. A dry gas supply unit separate from the vehicle is adapted to be coupled to the second end of each of the at least one on-board conduits to selectively supply dry gas thereto. The gas supply unit is configured to selectively supply dry gas to the second end of each of the at least one on-board conduits when the at least one moisture detection sensor associated with a particular on-board conduit outputs a signal indicating that moisture is present in the area adjacent thereto.

In a further embodiment, the vehicle may be an aircraft and each moisture detection sensor may be mounted in an area that is inaccessible during flight of the aircraft. Still further, each moisture detection sensor may be passive and output a signal upon receipt of an external interrogation signal. In addition, the external interrogation signal may originate at a controller that is part of the dry gas supply unit or may originate at a hand-held controller.

Still further, the dry gas supply unit may include a source of dry gas, a manifold having a first end coupled to the source of dry gas and a second end coupled to the second ends of each of the at least one on-board conduits, and a controller that is coupled to the manifold for selectively enabling the manifold to provide dry gas only to the second ends of those of the at least one on-board conduits having an associated sensor outputting a signal indicating that moisture is present in the area adjacent thereto. The source of dry gas may be an air conditioner coupled to a gas source. The air conditioner may control at least one of pressure, volume, temperature, and humidity of the dry gas provided to the manifold. The source of dry gas may be a tank of nitrogen.

In a second aspect, a system for detecting and removing moisture in a vehicle is disclosed. A plurality of moisture detection sensors are mounted in the vehicle for outputting a signal when moisture is present in an area adjacent thereto. A plurality of on-board conduits are installed in the vehicle having a first end adjacent to one of the at least one moisture detection sensors and a second end. A dry gas supply unit separate from the vehicle is adapted to be coupled to the second end of each of the at least one on-board conduits to selectively supply dry gas thereto. The gas supply unit is configured to selectively supply dry gas to the second end of each on-board conduit among the plurality of on-board conduits having an associated moisture detection sensor outputting a signal indicating that moisture is present in the area adjacent thereto.

In a third aspect, a method for detecting and removing moisture in a vehicle is disclosed. The vehicle includes a plurality of moisture detection sensors mounted in inaccessible areas of the vehicle and a plurality of on-board conduits having a first end positioned adjacent to a moisture detection sensor and a second end. First, a source of dry gas not present on the vehicle is coupled to the second end of each of the plurality of on-board conduits via a manifold that is controllable. Next, each of the moisture detection sensors is interrogated to determine if moisture is present in an area adjacent thereto. Finally, when at least one of the moisture detection sensors indicates that moisture is present in the area adjacent thereto, the manifold is activated so that dry gas is provided to the second ends of the on-board conduits. In a further aspect, dry gas may be provided only to the second ends of on-board conduits having a first end mounted adjacent to a moisture detection sensor having moisture present in the area adjacent thereto.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
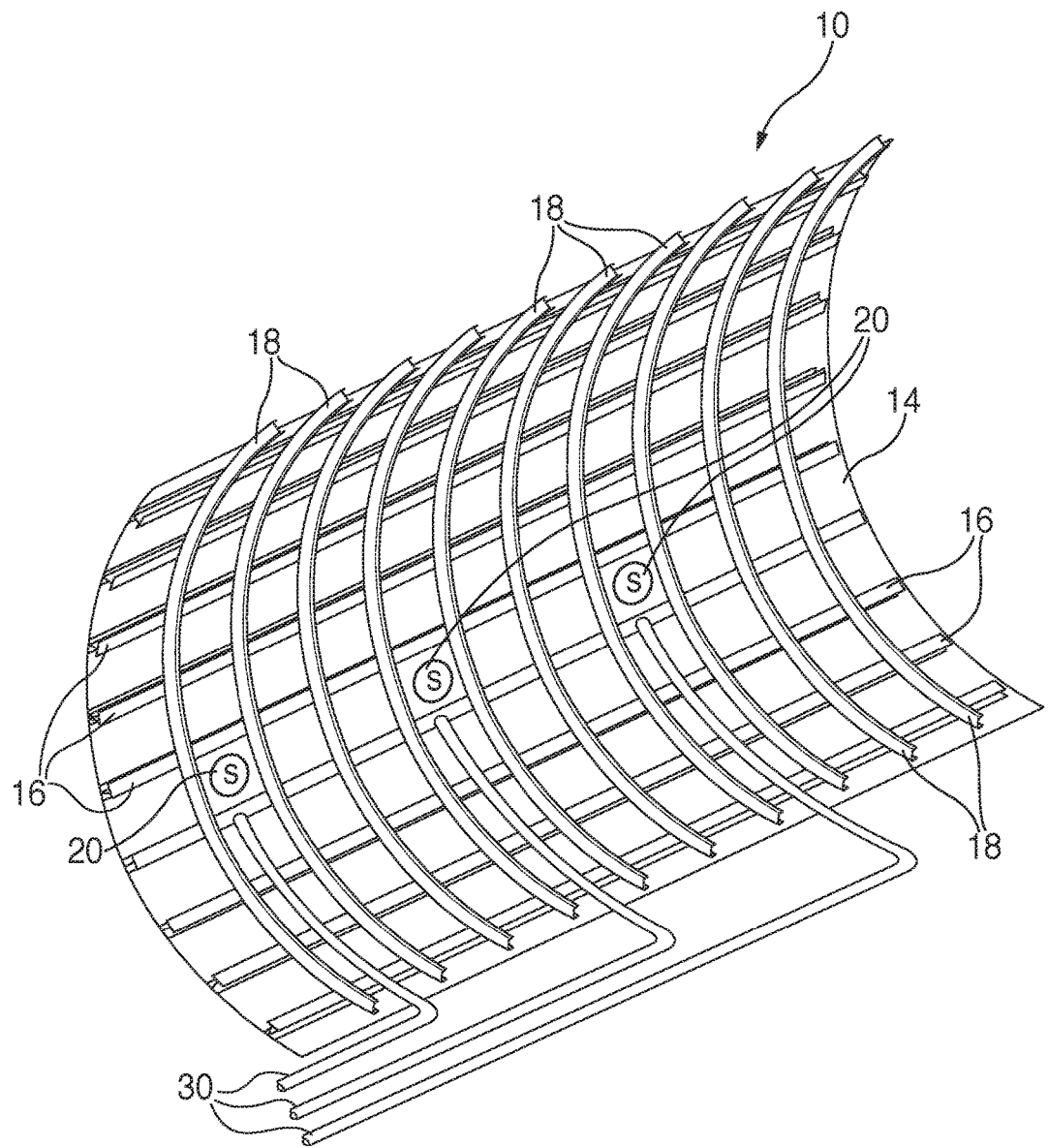
FIG. 1 is a diagram showing an aircraft fuselage portion including a series of sensors and associated conduits installed therein according to an embodiment of the present disclosure.

The present disclosure provides a ground-based system and method for detecting and removing moisture from inaccessible areas of a vehicle such as a commercial aircraft. As discussed above, such inaccessible areas in an aircraft may include, for example, areas behind sidewalls and under lavatories, galleys, and entry doors. As one of ordinary skill in the art will readily recognize, there can be many other inaccessible areas in which moisture may collect during operation of an aircraft. For the purposes of the present disclosure, an "inaccessible area" of a vehicle refers to an area of that vehicle that cannot be accessed during use of the vehicle because disassembly of some portion of the vehicle would be required to access such area. Referring now to FIG. 1, an exemplary inaccessible area 12 is shown. In particular, area 12 is the area between the inner surface of a fuselage 10 of an aircraft and the sidewall (the sidewall itself is not shown in FIG. 1, as one of ordinary skill will readily recognize, the sidewall is placed against the inner portion of fuselage 10 to create the inside environment of the aircraft). The system and method of the present disclosure may be used to remediate moisture from any inaccessible area of a vehicle such as a commercial aircraft, and the area 12 between the fuselage 10 and the sidewall is only one example of an inaccessible area. The fuselage 10 consists of an outer skin 14 that is formed over frame members 18 and longitudinal stringers 16 in a conventional manner. In accordance with the instant disclosure, a series of moisture sensors 20 are placed within the area 10 where moisture may accumulate. The moisture sensors 20 are preferably wireless and preferably output a signal corresponding to a current level of measure of moisture in an adjacent area upon receipt of an interrogation signal from a remote reader. Sensors 20 are preferably passive and receive power via the interrogation signal. However, in other embodiments, sensors 20 may receive power via a wired connection and may output signals via wired connections. The wired connections may be integrated into the aircraft's electrical system (e.g., for power) or may be embedded in or attached to each on-board conduit 30 (discussed below) to run to the ground-based cart discussed herein. In a presently preferred embodiment of the present invention, sensors 20 are passive devices which comprise a health monitoring sensor and one or more radio frequency identification ("RFID") chips for communications. For each sensor 20 placed in an inaccessible area of a vehicle, a corresponding on-board conduit 30 is preferably provided. In other embodiments, there may be more than one on-board conduit per sensor or, alternatively, more than one sensor per on-board conduit. Each on-board conduit 30 has a first end 25 positioned at an area near the corresponding sensor 20 and a second end 35 coupled to a manifold connector (not shown in FIG. 1). As discussed below, during the moisture detection and removal process, when a sensor 20 indicates the presence of moisture, dry compressed air or nitrogen gas is pumped, e.g., intermittently, into the associated on-board conduit 30 (via a ground-based cart discussed with respect to FIG. 2) to flood the area around that sensor 20 with dry compressed air or nitrogen gas in order to remove the moisture from such area by directing standing water to drains and to evaporate any remaining moisture. By using fractional inch tubing for the on-board conduits 30 and self-adhesive RFID-based sensors for sensors 20, the present disclosure provides an extremely lightweight solution for an installed moisture removal system installed in a commercial aircraft. In addition, the use of RFID-based sensors ensures that the system may be completely passive with respect to the aircraft's electronic system, no on-board power is required in the preferred embodiment at all.

Figure 2:
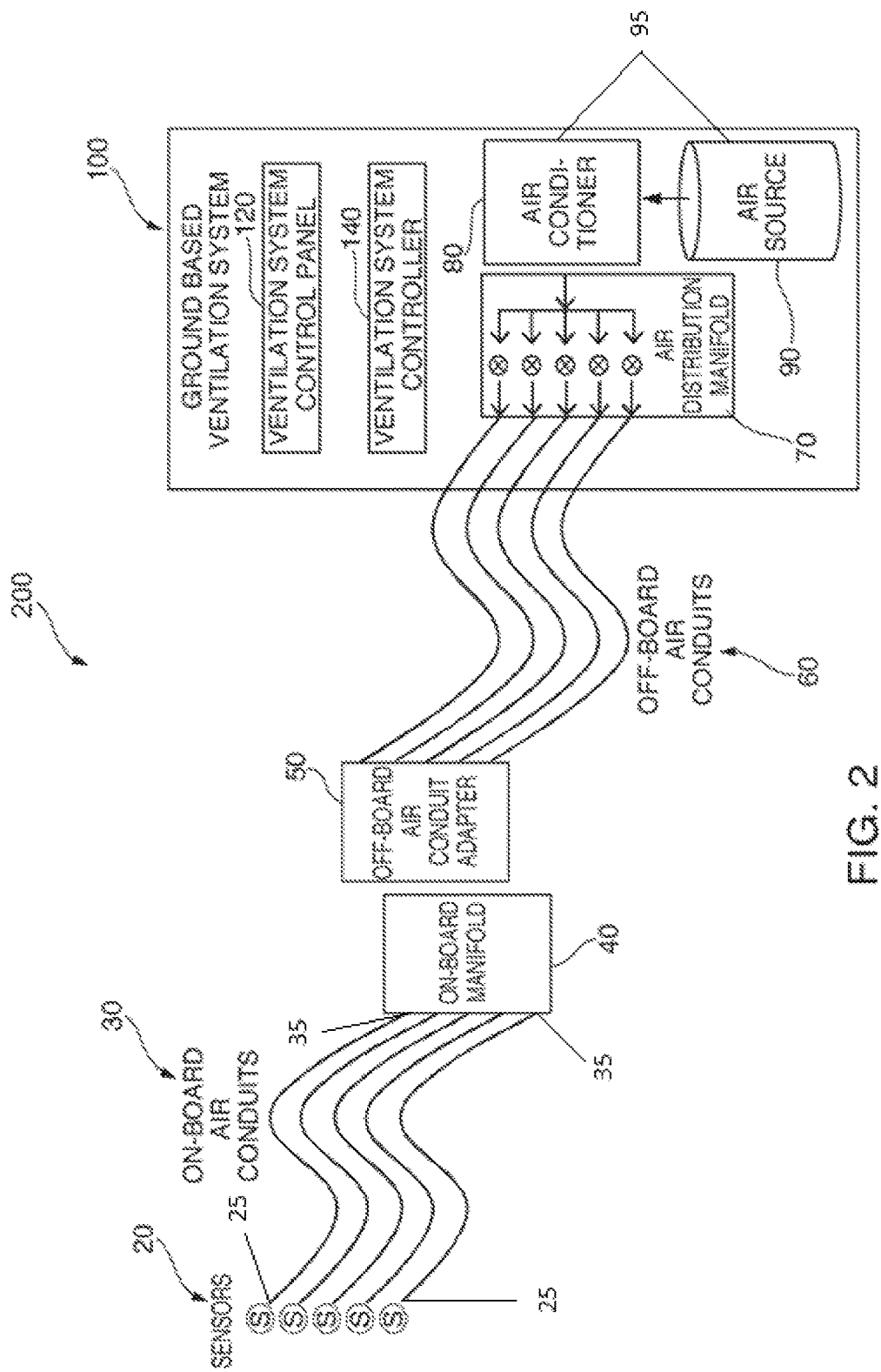
FIG. 2 is a block diagram of a system for detecting and removing moisture in an aircraft according to the present disclosure.

Referring now to FIG. 2, a ground-based system 200 for detecting and removing moisture from inaccessible areas of a vehicle includes a plurality of sensors 20 and associated on-board conduits 30 located in inaccessible areas of the vehicle, as discussed with respect to FIG. 1. Each of the on-board conduits 30 terminates at an on-board manifold connector 40 mounted on an accessible area on the vehicle. A ground-based ventilation unit 100 may be mounted on a cart and includes preferably includes an air source 90 coupled to an air conditioner 80. Air conditioner 80, in turn, is coupled to an air distribution manifold 70. Air source 90 and air conditioner 80 combine to provide a source of dry compressed gas 95. Air conditioner 80 selectively controls at least one of the pressure, volume, temperature, and humidity of the air output to air distribution manifold 70. Air source 90 may be a vent that inputs outside air to air conditioner 80. In the alternative, other air sources, e.g., a tank of compressed dry air or of nitrogen, may be used to provide a dry compressed air or other gas source for use with the present system. In some cases, e.g., when a take of nitrogen gas is used, air conditioner 80 may be omitted. Air distribution manifold 70 is coupled to an off-board manifold connector 50 via a plurality of off-board conduits 60 (each off-board conduit 60 is associated with a particular one of the on-board conduits 30). Air distribution manifold 70 is preferably controllable, so that the dry compressed air or gas may be selectively provided to either one or more or all of the off-board conduits 60 upon activation. When off-board manifold connector 50 is mated to on-board manifold connector 40, each off-board conduit 60 is mated to the associated on-board conduit 30 so that dry compressed air or nitrogen pumped into a distal end of each off-board conduit 60 (i.e., the end terminating at air distribution manifold 70) passes through the two manifold connectors 40, 50 through the associated on-board conduit 30 and then to the area adjacent to the associated sensor 20.

The ground-based ventilation unit 100 includes a control panel 120 and a controller 140. Control panel 120 is used to initiate the moisture detection and removal operation operations, to set the desired temperature, pressure and volume of the supplied air or gas, and to choose where the air or gas is directed (i.e., to select which of the conduits is supplied with air or gas). Controller 140 preferably interrogates each of the sensors 20 to determine whether moisture is present at areas adjacent to each sensor. The interrogation process may be done directly or via a connection to a handheld interrogation device (not shown) positioned within the vehicle. Alternatively, the handheld interrogation device may be used to interrogate each of the sensors 20 and a user may enter information identifying each of the sensors 20 outputting a moisture detection signal into control panel 120. Controller 140 also is coupled to the air distribution manifold 70 to, in a presently preferred embodiment, selectively control the flow of dry compressed air or other gas into each of the conduits (e.g., via electronic control valves mounted on the manifold). Preferably, the dry compressed air or other gas is only provided to off-board conduits 60 and the mating on-board conduits 30 that are associated with sensors 20 which signal that moisture is present in areas adjacent thereto. However, in an alternative embodiment, dry compressed air or other gas is provided to areas adjacent to all of the sensors 20 when any one of the sensors 20 indicate that moisture is present in the adjacent area (and no electronic control valves are required on manifold 70). Controller 140 also is preferably coupled to air conditioner 80 to specify one or more characteristics of the air to be provided to manifold 70, including but not limited to pressure, volume, temperature, and humidity. Notably, a lower pressure airflow may be provided to stimulate and enhance the evaporation process while a higher pressure airflow may be provided to direct standing water to nearby drains. In that respect, controller 140 may be configured to operate in a sequence whereby, during a first period, a higher pressure airflow is imposed to move standing water to drains and, during a second period, a lower pressure airflow is imposed to stimulate and enhance the evaporation process of any remaining moisture.

Figure 3:
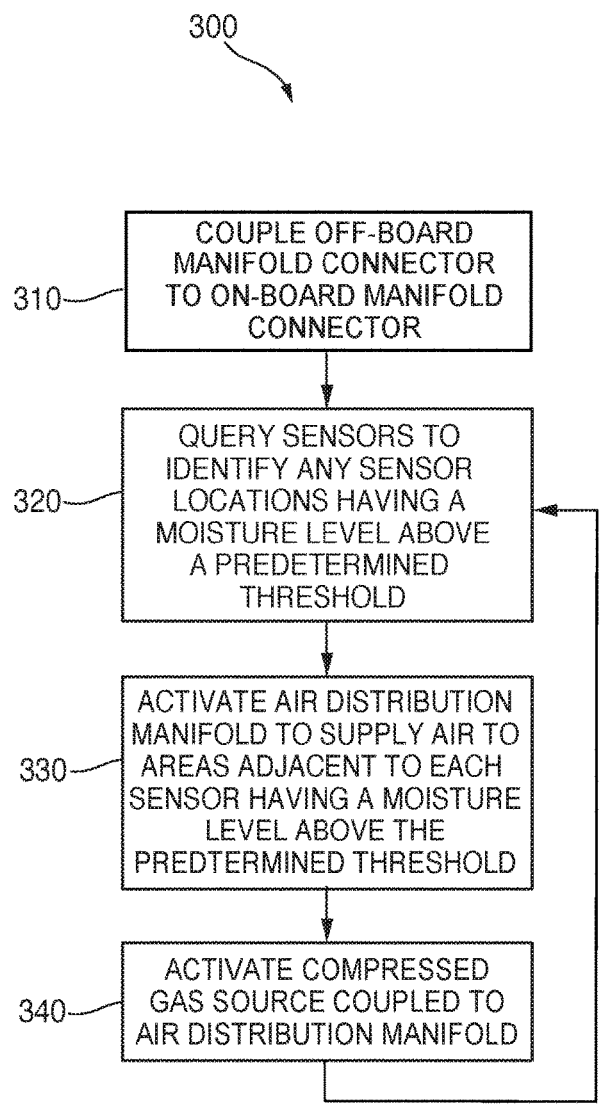
FIG. 3 is a flowchart of a method for detecting and removing moisture in an aircraft according to the present disclosure.

Referring now to FIG. 3, a flowchart 300 for a ground-based method for detecting and removing moisture from inaccessible areas of a vehicle is provided. In a first step 310, an off-board manifold connector 70 (FIG. 2) is coupled to an on-board manifold connector 40. Next, at step 320, each of the sensors 20 is queried (interrogated) to determine which of the sensors 20, if any, sense moisture in an adjacent area above a predetermined threshold. Once the sensors 20 identifying areas with moisture are identified, the air distribution manifold 70 is activated so that dry compressed air or other gas, via associated on-board conduits 30, 60, is only provided to the areas adjacent to the sensors 20 identified in step 320. Finally, at step 340, the dry compressed air or other gas source is coupled to air distribution manifold 70 to supply compress gas to the areas adjacent to the sensors 20 identified in step 320. In one embodiment, the dry compressed air or other gas is on an intermittent basis during operation. In another embodiment, the dry compressed air or other gas is suppled at a constant level. In either case, the dry compressed air or other gas may be first applied at a level strong enough to direct standing water to drains and then at a lower level to ensure that any remaining moisture is evaporated. After step 340 is completed, processing may be completed or may iteratively return to step 320 until none of the sensors 20 sense moisture above the predetermined threshold.

The system and method of the present disclosure provides the ability to flood certain areas of a vehicle such as a commercial aircraft with dry compressed air or gas pre-flight to reduce or eliminate condensation and frosting in those areas during flight. The system and method of the present disclosure also provides the ability to effectively melt and dry certain areas of a vehicle such as a commercial aircraft immediately post-flight to address condensation and frosting that may have occurred during flight. The system of the present disclosure can be installed as a retrofit in an existing vehicle such as a commercial aircraft by routing small diameter on-board air conduits each terminating at a first end in proximity to an associated one of a plurality of on-board moisture sensors and terminating at the second end at an on-board air conduit manifold that is connected to a ground-based cart while on the ground. The system and method disclosed herein may supplement other existing on-board moisture prevention and remediation systems. Further, the system and method disclosed herein can be used to address specific on-board moisture problems during gate turn-around and overnight service that are not readily addressed by conventional moisture prevention and remediation systems.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system for providing dry gas received from a dry gas supply unit into an interior of a vehicle to reduce moisture, the system comprising:
   at least one moisture detection sensor mounted in the vehicle to detect the presence of moisture;
   at least one on-board conduit installed in the vehicle having a first end adjacent to the at least one moisture detection sensor and a second end; and
   an on-board connector coupled to the second end of the at least one on-board conduit, wherein the at least one on-board conduit is configured to receive, at the second end, the dry gas in response to detecting a signal from the at least one moisture detection sensor and to provide the dry gas to an area adjacent to the at least one moisture detection sensor.

2. The system of claim 1, wherein the vehicle is an aircraft and the at least one moisture detection sensor is mounted in an area that is inaccessible during flight of the aircraft.

3. The system of claim 1, wherein the at least one moisture detection sensor comprises a passive moisture detection sensor and is configured to output the signal in response to an external interrogation signal.

4. The system of claim 3, wherein the external interrogation signal is generated at a controller of the dry gas supply unit.

5. The system of claim 3, wherein the external interrogation signal is generated at a hand-held controller.

6. The system of claim 1, wherein the dry gas supply unit comprises:
   a source of dry gas;
   a manifold coupled to the source of dry gas and coupled to an off-board connector via at least one off-board conduit; and
   a controller configured to selectively enable the manifold to provide the dry gas through the at least one off-board conduit to the second end of the at least one on-board conduit.

7. The system of claim 6, wherein the source of dry gas comprises an air conditioner coupled to a gas source.

8. The system of claim 7, wherein the air conditioner is configured to control at least one of pressure, volume, temperature, or humidity of the dry gas provided to the manifold.

9. The system of claim 6, wherein the source of dry gas comprises a tank of nitrogen.

10. A system for providing dry gas received from a dry gas supply unit into an interior of a vehicle to reduce moisture, the system comprising:
- a plurality of moisture detection sensors mounted in the vehicle to detect the presence of moisture;
- a plurality of on-board conduits installed in the vehicle, wherein the plurality of on-board conduits each have a first end and a second end, wherein each of the first ends of the plurality of on-board conduits is mounted adjacent to an associated one of the plurality of moisture detection sensors; and
- an on-board connector coupled to each of the second ends of the plurality of on-board conduits, wherein each of the plurality of on-board conduits is configured to receive, at the second end, the dry gas in response to detecting a signal from the associated moisture detection sensor and to provide the dry gas to an area adjacent to the associated moisture detection sensor.

11. The system of claim 10, wherein the vehicle is an aircraft and each of the plurality of moisture detection sensors is mounted in an area that is inaccessible during flight of the aircraft.

12. The system of claim 10, wherein each of the plurality of moisture detection sensors comprise a passive moisture detector sensor and is configured to output the signal in response to an external interrogation signal.

13. The system of claim 12, wherein the external interrogation signal is generated at a controller of the dry gas supply unit.

14. The system of claim 12, wherein the external interrogation signal is generated at a hand-held controller.

15. The system of claim 10, wherein the dry gas supply unit comprises:
- a source of dry gas;
- a manifold coupled to the source of dry gas and coupled to an off-board connector via a plurality of conduits; and
- a controller configured to selectively enable the manifold to provide the dry gas to one or more of the second ends of the plurality of on-board conduits.

16. The system of claim 15, wherein the source of dry gas comprises an air conditioner coupled to a gas source.

17. The system of claim 16, wherein the air conditioner is configured to control at least one of pressure, volume, temperature, or humidity of the dry gas provided to the manifold.

18. The system of claim 15, wherein the source of dry gas comprises a tank of nitrogen.

19. A method for detecting and reducing moisture in a vehicle, the vehicle including a plurality of moisture detection sensors mounted in inaccessible areas of the vehicle and a plurality of on-board conduits each having a first end positioned adjacent to a moisture detection sensor and a second end coupled to an on-board connector, the method comprising:
- coupling an off-board connector of a dry gas supply unit not present on the vehicle to the on-board connector;
- interrogating each of the plurality of moisture detection sensors; and
- in response to detecting one or more signals from at least one of the plurality of moisture detection sensors, configuring a manifold of the dry gas supply unit to enable the dry gas to be provided to one or more of the second ends of the plurality of on-board conduits.

20. The method of claim 19, wherein the dry gas is provided to the second end of a particular on-board conduit in response to detecting a signal from the moisture detection sensor mounted adjacent to the first end of the particular on-board conduit.

* * * * *